United States Patent [19]

Corbin et al.

[11] Patent Number: 5,162,467

[45] Date of Patent: Nov. 10, 1992

[54] ZEOLITE-CATALYZED GROUP TRANSFER POLYMERIZATION

[75] Inventors: David R. Corbin, West Chester, Pa.; Patricia M. E. Sormani, Newark, Del.

[73] Assignee: E. I. Du Pont de Nemours and Company, Wilmington, Del.

[21] Appl. No.: 682,205

[22] Filed: Apr. 2, 1991

[51] Int. Cl.$^5$ .......................... C08F 4/58; C08F 20/18
[52] U.S. Cl. .................... 526/194; 526/328; 526/329.7
[58] Field of Search ........................................ 526/194

[56] References Cited

U.S. PATENT DOCUMENTS

| | | | |
|---|---|---|---|
| 3,365,433 | 1/1968 | Manson | 526/194 |
| 4,508,880 | 4/1985 | Webster | 526/190 |
| 4,605,716 | 8/1986 | Hertler | |
| 4,732,955 | 3/1988 | Dicker | |
| 4,835,319 | 5/1989 | Corbin et al. | |
| 4,940,760 | 7/1990 | Boettcher et al. | 526/190 |
| 5,055,536 | 10/1991 | DuBois | 526/194 |

OTHER PUBLICATIONS

D. Y. Sogah et al., (1987) Macromol 20, pp. 1473–1488.
Kirk–Othmer Encyc. Chem. Tech., 3rd ed., vol. 15, p. 655 (Molecular Sieves).
"An Introduction to Zeolite Molecular Sieves", by A. Dyer, John Wiley & Sons, 1988, pp. 121–124.

Primary Examiner—Joseph L. Schofer
Assistant Examiner—M. Nagumo

[57] ABSTRACT

Lewis acid zeolites are used as catalysts for group transfer polymerizations of alkyl acrylates.

18 Claims, No Drawings

ZEOLITE-CATALYZED GROUP TRANSFER POLYMERIZATION

BACKGROUND OF THE INVENTION

1. Field of the Invention

This invention relates to the group transfer polymerization of acrylates catalyzed by selected zeolites.

2. Background

Processes are known for polymerizing acrylic monomers to a "living" polymer in the presence of an initiator, which is a tetracoordinate organosilicon compound having at least one initiating site, and a catalyst. Such polymerization processes have become known in the art as Group Transfer Polymerization, (GTP), as disclosed by Webster et al., J. Am. Chem. Soc., 105; 5706 (1983) and also for example by U.S. Pat. Nos. 4,417,034 and 4,508,880. Catalysts known to be useful in such polymerization reactions include a source of bifluoride ions $HF_2^-$, a source of fluoride, cyanide or azide ions, or a source of certain oxyanions, or a suitable Lewis acid, for example, zinc chloride, bromide or iodide, boron trifluoride and an alkyl aluminum oxide or an alkyl aluminum chloride. Also certain mercury compounds such as mercuric iodide are useful catalysts for the polymerization of acrylates as taught for example in U.S. Pat. No. 4,732,955 issued Mar. 22, 1988 to I. B. Dicker.

An object of this invention is to provide additional catalysts which can be used for the polymerization of acrylate esters using GTP processes disclosed in the aforesaid patents. Another object is to provide such catalysts which avoid the environmental problems associated with mercury compounds; also catalysts which are effective for polymerizations at or above room temperature, which can provide polymers having a narrow molecular weight distribution, and which can avoid a bimodal molecular weight distribution. These and other objects will be apparent from the disclosure which follows.

SUMMARY OF THE INVENTION

This invention provides an improved group transfer polymerization process that produces a "living" polymer comprising contacting under polymerizing conditions at least one acrylic monomer of the formula $CH_2=CHC(O)OX'$ with a tetracoordinate organosilicon initiator of the formula Q'SiZ, wherein:

X' is an aliphatic hydrocarbyl radical containing from 1 to 20 carbon atoms, or $-CH_2CH_2OSi(CH_3)_3$;

Q' is $-(OR)_{3-x}(R)_x$;

Z is $-O-C(X'')=C(R')(R'')$

X= is $-OSi(X')_3$, or $-OX'$

R is $-CH_3$;

each of R' and R'' is selected independently from hydrogen and a hydrocarbyl radical as defined for X';

x is 0, 1, 2 or 3;

and with a co-catalyst, wherein the improvement comprises using as the co-catalyst an effective amount of a zeolite having Lewis acid sites, preferably a calcined zeolite.

Generally speaking, zeolites are complex aluminosilicates characterized by a three-dimensional framework structure enclosing cavities occupied by ions and water molecules, all of which can move with significant freedom within the zeolite matrix. The zeolites useful in the process of this invention are in the Lewis acid form. The Lewis acid form can be obtained by exchange of ammonium ions for metal ions, as known in the art, followed by calcination. It also may be obtained by direct ion exchange of metal ions with a mineral acid followed by calcination. Upon calcination of the ammonium form of the zeolite, the Lewis acid sites are formed by the loss of ammonia. Calcination of the proton or acid-exchanged form above about 550° C. results in the loss of water with the consequent formation of Lewis sites. It is believed that the Lewis acid sites present in the zeolites are responsible for the catalytic activity. The degree of conversion of ammoniated or Bronsted sites to Lewis acid sites in the calcined zeolite must only be sufficient to provide the desired catalysis. Normally the acidity of Bronsted sites should be minimized to avoid any adverse effect on the group transfer polymerization process. For a discussion of acid sites in zeolites, see Dwyer, "Zeolite Structure, Composition, and Catalysis", Chemistry and Industry, Apr. 2, 1984, pp. 258–269 and "An Introduction to Zeolite Molecular Sieves" by A Dyer, John Wiley and Sons, 1988, pp. 121–124.

DETAILED DESCRIPTION OF THE INVENTION

The present invention provides a group transfer polymerization process comprising contacting under polymerizing conditions at least one alkyl acrylate ester monomer which is an ester of an aliphatic alcohol containing from 1-20 carbon atoms, with a tetracoordinate organosilicon initiator and a catalyst which is a zeolite containing Lewis acid sites. Preferred acrylate esters include the lower alkyl acrylates such as methyl, ethyl, n-butyl and ethylhexyl acrylates.

Suitable tetracoordinate organosilicon initiators as used in this process include those of the formula Q'SiZ wherein Q' is $-(OR)_{3-x}(R)_x$; Z is $-O-C(X'')=C(R')(R'')$; X'' is $-OSI(X')_3$, or $-OX'$; R is $-CH_3$, as defined above.

The polymerization reaction preferably is performed in a solvent, which is preferably toluene. Useful, but less effective than toluene, as a solvent are acetonitrile and hexane. In contrast to some known group transfer polymerization processes which provide better results at room temperature without heating, the process of this invention proceeds at room temperature, or at reflux conditions in toluene, with substantially equal good results.

Another advantage of the present invention is that the zeolite can be reused in subsequent polymerizations without reactivation provided it is removed, for example by filtration, from the reaction medium prior to quenching of the "living" polymer.

Suitable zeolites, when in the Lewis acid form, include certain commercial materials known under the designations SK-500, ELZ-20, calcined M-8 Mordenite, sold by Union Carbide Corporation, and "Zeolon" 900H Mordenite, sold by the PQ Corporation. Also suitable are CBV-712, CBV-20A, CBV-500, CBV-610, CBV-720 from Conteka; and Valfor CP-301-68 and Cp-300-35 from PQ Corporation, Valley Forge, PA. The zeolites can be in powder or pellet form, but work best in powder form.

Zeolites preferred for their efficiency include Mordenite, Clinoptilolite and type "Y" zeolites (pore size approximately 8 Angstroms, e.g. ELZ-20) that have been activated at 600–700° C. Good results are obtained using a small pore zeolite, about 4 Angstroms, RHO zeolite.

The silicon/aluminum ratio in the zeolite can vary which changes both the acid strength and the number of acid sites. In general, the larger the ratio, the stronger the acidity but the fewer the sites. The two factors can be balanced to give the desired activity. The zeolite structure also is important as demonstrated by the fact that a thermally decomposed zeolite, essentially an amorphous $SiO_2/Al_2O_3$, gave no polymerization. A zeolite containing rare earth metal ions, such as zeolite SK-500, tends to give poorer conversion of monomer to polymer and a broader polydispersity polymer under the same reaction conditions as compared to the preferred zeolites without metal ions.

The process of this invention can be used to prepare colorless, odorless, transparent polyacrylates with controlled molecular weight and end groups having a narrow molecular weight distribution, for example Mw/Mn of less than 1.1. Molecular weights from about 300 up to about 10,000 can be attained. Low molecular weight oligomers such as poly(ethylacrylate) having a degree of polymerization of less than 5 can be prepared.

The polymerizations are typically carried out at room temperature in a batch process; to start the polymerization, the initiator is charged to the reaction vessel as the final ingredient. It is not necessary to control the resulting exotherm, as is the case with mercuric iodide-catalyzed group transfer polymerizations, because no high temperature side reactions have been observed. In general, quantitative conversions of monomer can be obtained in less than one hour reaction time.

Reactions are typically carried out at a concentration of about 20% solids but can be performed successfully up to about 50% solids levels.

An exemplary polymerization uses 0.04-0.3 grams of zeolite catalyst to polymerize 5-10 grams of monomer. The solvent, zeolite and initiator can be charged to the reaction vessel and monomer fed at, for example, 0.5 ml per minute. Preferably the solvent, zeolite and monomer are added first, and then the initiator is added all at once. For the fastest and most controllable reaction, toluene is preferred as the solvent. Acetonitrile gives products having a broader molecular weight distribution, i.e. polydispersity. The narrowest molecular weight distributions are obtained in batch polymerizations with polydispersities, D, of less than 1.1 consistently being obtainable. The same sample of catalysts can be used for repeated polymerizations to give oligomers of comparable molecular weight and molecular weight distribution.

The present process provides "living" polymers prepared by methods comparable to those described in the aforesaid patents and publications regarding group transfer polymerization. By "living" polymer is meant a polymer which contains at least one initiating site and is capable of polymerizing further in the presence of additional monomer and catalyst.

In the process of this invention, temperatures, concentrations of starting materials and precautions against moisture, and considerations thereof are generally known as in the art of group transfer polymerization.

The polymers provided by the process of the invention are in general similar to, and have similar utility, to those described and known in the art. The "living" polymers may be quenched by reaction with a protic material such as water or methanol, or capped with appropriate capping agents. Preferably quenching occurs after removal of the catalyst to facilitate its re-use. Functionality can be introduced into the polymers by employing either a monomer or initiator containing functional substituents that are either inert under polymerizing conditions or are protected, or by employing a functionalized capping agent as known in the art. By initiating with a functional initiator and terminating the reaction with an appropriate reagent, such as benzaldehyde, telechelic polyacrylates can be prepared. Such functionally terminated polyacrylates can be used to prepare new graft or block polymers.

In the following examples of the invention, weight and number average molecular weights of the polymer products, $M_w$ and $M_n$, were measured by gel permeation chromatography (GPC) using "Lucite" standards for molecular weight calibration. The polydispersity of the polymer is defined by $D = M_w/M_n$.

In general the rate of the reaction will increase as the amount of catalyst employed is increased.

EXAMPLE 1

Polymerization of Ethyl Acrylate by Monomer-feed Process Catalyzed by Type Y Zeolite A 10 g sample of zeolite Y [ELZ-20 (Union Carbide)] was calcined in flowing air by raising the temperature 60° C./h to 550° C. and then heating at 550° C. for 10h.

To a 100 ml round bottom flask was added 0.08 g of the calcined zeolite. The flask was sealed with a septum under a nitrogen stream and the flask and contents were heated using a hot air gun to ca. 50° C. Upon reaching 150° C., the heat source was removed and the flask and contents allowed to cool under a stream of nitrogen. At room temperature, 20 ml toluene and 0.35 ml (0.002 moles) [(1-methoxy-2-methyl-1-propenyl)oxy]-trimethylsilane (MTS) were added by syringe under nitrogen. Over a period of 8 minutes 5.4 ml ethyl acrylate were added by syringe. Exothermic polymerization occurred. After a total of 60 minutes reaction, 2 ml methanol were added by syringe and the mixture was stripped of volatiles. A total of 2.8 g of poly(ethyl acrylate) were obtained. GPC: [Mn] 1870; [Mw] 2180; D 1.17; theor. [Mn] for 56% conversion 1400.

EXAMPLE 2

Polymerization of Ethyl Acrylate at Reflux Catalyzed by Type Y zeolite

A 10 g sample of zeolite Y [ELZ-20 (Union Carbide)] was calcined in flowing air by raising the temperature 60° C./h to 550° C. and then heating at 550° C. for 10h.

To a 250 ml round bottom flask fitted with a reflux condenser was added 0.08 g of the calcined zeolite under nitrogen. The flask was sealed with a septum under a nitrogen stream and the flask, condenser and contents were heated using a hot air gun to ca. 150° C. Upon reaching 150° C., the heat source was removed and the flask and contents allowed to cool under a stream of nitrogen. At room temperature, 20 ml toluene and 5.4 ml ethyl acrylate were added by syringe. The mixture was heated to reflux and 0.35 ml (0.002 mole) [(1-methoxy-2-methyl-1-propenyl)oxy]-trimethylsilane were added all at once by syringe. After 60 minutes, the mixture was allowed to cool to room temperature and 2 ml methanol were added by syringe. A total of 4.4 g poly(ethyl acrylate) were obtained. GPC: [Mn] 2830; [Mw] 3090; D 1.09; theor. Mn for 89% conversion 2225.

EXAMPLE 3

Effect of Variation in Si/Al Ratio of Type Y Zeolite

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 0.35 ml (0.002 moles) [(1-methoxy-2-methyl-1-propenyl)oxy]-trimethylsilane (MTS) were added by syringe under nitrogen. Over a period of 10 minutes 5.4 ml ethyl acrylate were added by syringe. Exothermic polymerization occurred. After a total of 60 minutes reaction, 2 ml methanol were added by syringe and the mixture was stripped of volatiles. The following results were obtained:

[E1517-166] A sample of zeolite Y [CBV-400 (CONTEKA)] was calcined in flowing air by raising the temperature 60° C./h to 700° C. and then heating at 700° C. for 10h.

[E1517-168] A sample of zeolite Y [CBV-610 (CONTEKA)] was calcined in flowing air by raising the temperature 60° C./h to 700° C. and then heating at 700° C. for 10h.

[E1517-191] A 10 g sample of zeolite Y [ELZ-20 (Union Carbide)] was calcined in flowing air by raising the temperature 60° C./h to 550° C. and then heating at 550° C. for 10h.

[E1517-167] A sample of zeolite Y [CBV-500 (CONTEKA)] was calcined in flowing air by raising the temperature 60° C./h to 700° C. and then heating at 700° C. for 10h.

[E1517-169] A sample of zeolite Y [CBV-712 (CONTEKA)] was calcined in flowing air by raising the temperature 60° C./h to 700° C. and then heating at 700° C. for 10h.

[E1517-170] A sample of zeolite Y [CBV-720 (CONTEKA)] was calcined in flowing air by raising the temperature 60° C./h to 700° C. and then heating at 700° C. for 10h.

Chemical analyses (Si/Al) were determined by Inductively Coupled Plasma Spectrometry.

|            | Si/Al ratio | % Conversion | Mn   | D    |
|------------|-------------|--------------|------|------|
| (E1517-166)| 2.23        | 18           | —    | —    |
| (E1517-168)| 2.63        | 64           | 1870 | 1.32 |
| (E1517-191)| 2.43        | 77           | 2230 | 1.68 |
| (E1517-167)| 2.97        | 84           | 2420 | 1.56 |
| (E1517-169)| 4.94        | 98           | 2700 | 1.53 |
| (E1517-170)| 12.4        | 45           | 1330 | 1.26 |

This shows that a very effective Si/Al in Type Y Zeolite is about 5.

EXAMPLE 4

Polymerization of Ethyl Acrylate Catalyzed by Type Y Zeolite

A sample of zeolite Y [CBV-712 (CONTEKA)] was calcined in flowing air by raising the temperature 60° C./h to 700° C. and then heating at 700° C. for 10h.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.4 ml ethyl acrylate were added by syringe to the flask under a blanket of nitrogen. To this stirred mixture at room temperature was added by syringe all at once 0.35 ml (0.002 mole) [(1-methoxy-2-methyl-.1-propenyl)oxy]-trimethylsilane (MTS). Exothermic polymerization occurred. After 60 minutes reaction, 2 ml methanol were added by syringe and the mixture was stripped of volatiles. A total of 5.3 g poly(ethyl acrylate) were obtained. GPC: [Mn] 4430; [Mw] 4920; D 1.11; theor. [Mn] 2500.

EXAMPLE 5

Polymerization of Methyl Acrylate Catalyzed by Type Y Zeolite

A sample of zeolite Y [CBV-712 (CONTEKA)] was calcined in flowing air by raising the temperature 60° C./h to 700° C. and then heating at 700° C. for 10h.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.2 ml methyl acrylate were added by syringe to the flask under a blanket of nitrogen. To this stirred mixture at room temperature was added by syringe all at once 0.35 ml (0.002 mole) [(1-methoxy-2-methyl-1-propenyl)oxy]-trimethylsilane (MTS). Exothermic polymerization occurred. After 60 minutes reaction, 2 ml methanol were added and the mixture was stripped of volatiles. A total of 5.3 g of poly(methyl acrylate) were obtained. GPC: [Mn] 3820; [Mw] 4110; D 1.08; theor. [Mn] 2500.

EXAMPLE 6

Polymerization of Butyl Acrylate Catalyzed by Type Y Zeolite

A sample of zeolite Y [CBV-712 (CONTEKA)] was calcined in flowing air by raising the temperature 60° C./h to 700° C. and then heating at 700° C. for 10h.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.6 ml butyl acrylate were added by syringe to the flask under a blanket of nitrogen. To this stirred mixture at room temperature was added by syringe all at once 0.35 ml (0.002 mole) [(1-methoxy-2-methyl-1-propenyl)-oxy]-trimethylsilane (MTS). Exothermic polymerization occurred. After 60 minutes reaction, 2 ml methanol were added and the mixture was stripped of volatiles. A total of 5.3 g of poly(butyl acrylate) were obtained. GPC: [Mn.] 3600; [Mw] 3680; D 1.02; theor. [Mn] 2500.

EXAMPLE 7

Polymerization of 2-Ethyl Hexyl Acrylate Catalyzed by Type Y Zeolite

A sample of zeolite Y [CBV-712 (CONTEKA)] was calcined in flowing air by raising the temperature 60° C./h to 700° C. and then heating at 700° C. for 10h.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.65 ml 2-ethyl hexyl acrylate (previously dried by passage two times over a column of alumina) were added by syringe to the flask under a blanket of nitrogen. To this stirred mixture at room temperature was added by syringe all at once 0.35 ml (0.002 moles) [(.1-methoxy-2-methyl-1-propenyl)oxy]-trimethylsilane (MTS). Exothermic polymerization occurred. After 60 minutes reaction 2 ml methanol were added and the mixture stripped of volatiles. A total of 5.5 g of poly(2-ethyl hexyl acrylate) were obtained. GPC: [Mn] 4170; [Mw] 4410; D 1.06; theor. [Mn] 2500.

EXAMPLE 8

Polymerization of Ethyl Acrylate Catalyzed by Type Y Zeolite in Dry Air

A sample of zeolite Y [CBV-712 (CONTEKA)] was calcined in flowing air by raising the temperature 60° C./h to 700° C. and then heating at 700° C. for 10h.

To a 100 ml round bottom flask was added 0.08 g zeolite. The flask was sealed with a septum under a nitrogen stream and the flask and contents were heated using a hot air gun to ca. 150° C. Upon reaching 150° C, the heat source was removed and the flask and contents allowed to cool under a stream of nitrogen. After reaching room temperature, the nitrogen stream was replaced by a blanket of dry air. By syringe 20 ml toluene and 5.4 ml ethyl acrylate were added. To this stirred mixture was added by syringe all at once 0.35 ml (0.002 moles) [(1-methoxy-2-methyl-1-propenyl)oxy]-trimethylsilane (MTS). Exothermic polymerization occurred. After 60 minutes reaction, 2 ml methanol were added and the mixture was stripped of volatiles. A total of 5.1 g poly(ethyl acrylate) were obtained. GPC: [Mn] 4030; [Mw] 4310; D1.07; theor. [Mn] 2500.

EXAMPLE 9

Polymerization of Ethyl Acrylate Catalyzed by Type Y Zeolite at Higher Solids Level A sample of zeolite Y [CBV-712 (CONTEKA)] was calcined in flowing air by raising the temperature 60° C./h to 700° C. and then heating at 700° C. for 10h. To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 10 ml toluene and 5.4 ml butyl acrylate were added by syringe to the flask under a blanket of nitrogen. To this stirred mixture under at room temperature was added by syringe all at once 0.35 ml (0.002 mole) [(1-methoxy-2-methyl-1-propenyl)oxy]-trimethylsilane (MTS). Exothermic polymerization occurred. After 60 minutes, the reaction mixture was stripped of volatiles. A total of 4.8 g poly(ethyl acrylate) were obtained. GPC: [Mn] 4620; [Mw] 5130; D 1.11; theor. [Mn] 2500.

EXAMPLE 10

Polymerization of Ethyl Acrylate Catalyzed by Type Y Zeolite at Higher Solids Level A sample of zeolite Y [CBV-712 (CONTEKA)] was calcined in flowing air by raising the temperature 60° C./h to 700° C. and then heating at 700° C. for 10h.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 5 ml toluene and 5.4 ml ethyl acrylate were added by syringe to the flask under a blanket of nitrogen. To this stirred mixture under at room temperature was added by syringe all at once 0.35 ml (0.002 mole) [(1-methoxy-2-methyl-1-propenyl)oxy]-trimethylsilane (MTS). Exothermic polymerization occurred. After 60 minutes, the reaction mixture was stripped of volatiles. A total of 4.3 g poly(ethyl acrylate) were obtained. GPC: [Mn] 4330; [Mw] 4870; D 1.12; theor. [Mn] 2500.

EXAMPLE 11

Polymerization of Ethyl Acrylate Catalyzed by Type Y Zeolite

A sample of zeolite Y [CBV-712 (CONTEKA)] was calcined in flowing air by raising the temperature 60° C./h to 700° C. and then heating at 700° C. for 10h.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.4 ml ethyl acrylate were added by syringe to the flask under a blanket of nitrogen. To this stirred mixture under a blanket of nitrogen at room temperature was added by syringe all at once 0.52 ml (0.002 mole) 1,1-bis(trimethylsiloxy)-2-methyl propene. Exothermic polymerization occurred. After 60 minutes, the reaction mixture was stripped of volatiles. A total of 5.6 g poly(ethyl acrylate) were obtained. GPC: Mn] 3320; [Mw] 3580; D .1.08; theor. [Mn] 2500.

EXAMPLE 12

Polymerization of Ethyl Acrylate Catalyzed by Type Y Zeolite

A sample of zeolite Y [CBV-712 (CONTEKA)] was calcined in flowing air by raising the temperature 60° C./h to 700° C. and then heating at 700° C. for .10h.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 40 ml toluene and 10.8 ml ethyl acrylate were added by syringe to the flask under a blanket of nitrogen. To this stirred mixture under a blanket of nitrogen at room temperature was added by syringe all at once 0.35 ml (0.002 mole) [(1-methoxy-2-methyl-1-propenyl)oxy]-trimethylsilane (MTS). Exothermic polymerization occurred. After 60 minutes, the reaction mixture was stripped of volatiles. A total of 10.0 g poly(ethyl acrylate) were obtained. GPC: [Mn] 7240; [Mw] 7690; D 1.06; theor. [Mn] 5000.

EXAMPLE 13

Times Catalyzed by Type Y Zeolite

A sample of zeolite Y [CBV-712 (CONTEKA)] was calcined in flowing air by raising the temperature 60° C./h to 700° C. and then heating at 700° C for 10h.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.4 ml ethyl acrylate were added by syringe to the flask under a blanket of nitrogen. To this stirred mixture under a blanket of nitrogen at room temperature was added by syringe all at once 0.35 ml (0.002 mole) [(1-methoxy-2-methyl-1-propenyl)oxy]-trimethylsilane (MTS). Exothermic polymerization occurred. The following results were obtained:

|   | Reaction Time (minutes) | wt Poly(ethyl acrylate) | theor. Mn | Mn | Mw | D |
|---|---|---|---|---|---|---|
| E64084-117B | 4 | 3.7 g | 1850 | 3000 | 3370 | 1.12 |
| E64084-117C | 6 | 4.5 g | 2250 | 3890 | 4400 | 1.13 |
| E64084-117D | 10 | 5.3 g | 2500 | 4690 | 5000 | 1.13 |

EXAMPLE 14

Polymerization of Ethyl Acrylate by Monomer-feed Process Catalyzed by Type Y Zeolite A 10 g sample of zeolite Y [ELZ-20 (Union Carbide)] was calcined in flowing air by raising the temperature 60° C./h to 550° C. and then heating at 550° C. for 10h.

To a 100 ml round bottom flask was added 0.04 .g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature 20 ml toluene and 0.35 ml (0.002 moles) [(1-methoxy-2-methyl-1-propenyl)oxy]-trimethylsilane (MTS) were added by syringe under a blanket of nitrogen Over a period of 10 minutes 5.4 ml ethyl acrylate were added by syringe. Exothermic polymerization occurred. After a total of 90 minutes reaction 2 ml methanol were added by syringe and the mixture stripped of volatiles. A total of 4.6 g poly(ethyl acrylate) were obtained. GPC: [Mn] 2130; [Mw] 2780; D 1.31; theor. [Mn] 2300.

EXAMPLE 15

Polymerization of Methyl Acrylate by Monomer-feed Process Catalyzed by Type Y Zeolite A 10 g sample of zeolite Y [ELZ-20 (Union Carbide)] was calcined in flowing air by raising the temperature 60° C./h to 550° C. and then heating at 550° C. for 10h.

To a 100 ml round bottom flask were added 0.04 g zeolite, 20 ml toluene and 0.35 ml (0.002 moles) [(1-methoxy-2-methyl-1-propenyl)oxy]-trimethylsilane (MTS) by syringe at room temperature under a blanket of nitrogen.. Over a period of 10 minutes 5.2 ml methyl acrylate were added by syringe. Exothermic polymerization occurred. After a total of 55 minutes reaction 2 ml methanol were added and the mixture stripped of volatiles. A total of 1.94 g poly(methyl acrylate) were obtained. GPC: [Mn] 1010; [Mw] 1390; D 1.38; theor. [Mn] 970.

EXAMPLE 16

Polymerization of Butyl Acrylate by Monomer-feed Process Catalyzed by Type Y Zeolite A 10 g sample of zeolite Y [ELZ-20 (Union Carbide)] was calcined in flowing air by raising the temperature 60° C./h to 550° C. and then heating at 550° C. for 10.

To a 100 ml round bottom flask was added 0.04 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature 20 ml toluene and 0.35 ml (0.002 moles) [(1-methoxy-2-methyl-1-propenyl)-oxy]-trimethylsilane (MTS) were added by syringe under a blanket of nitrogen Over a period of 10 minutes 5.6 ml butyl acrylate were added by syringe. Exothermic polymerization occurred. After a total of 60 minutes reaction 2 ml methanol were added and the mixture stripped of volatiles. A total of 2.54 g poly(butyl acrylate) were obtained. GPC: [Mn] 1310; [Mw] 1810; D 1.38; theor. [Mn] 1270.

EXAMPLE 17

Polymerization of Ethyl Acrylate Catalyzed by Type Y Zeolite at Higher Zeolite Loading A 10 g sample of zeolite Y [ELZ-20 (Union Carbide)] was calcined in flowing air by raising the temperature 60° C./h to 550° C. and then heating at 550° C. for 10h.

To a 100 ml round bottom flask were added 0.16 g zeolite, 20 ml toluene and 0.35 ml (0.002 moles) [(1-methoxy-2-methyl-1-propenyl)oxy]-trimethylsilane (MTS) by syringe at room temperature under a blanket of nitrogen. Over a period of 10 minutes 5.4 ml ethyl acrylate were added by syringe. Exothermic polymerization occurred An ice-water bath was used to maintain the reaction temperature at or below 35° C. After a total of 90 minutes reaction 2 ml methanol were added and the mixture stripped of volatiles. A total of 4.3 g poly(ethyl acrylate) were obtained. GPC: [Mn] 4320; [Mw.] 7100; D 1.64; theor. [Mn] 2150.

EXAMPLE 18

Polymerization of Ethyl Acrylate Catalyzed by Mordenite Zeolite

A sample of CBV-20A (CONTEKA) was calcined in flowing air by raising the temperature 60° C./h to 700° C. and then heating at 700° C. for 10h.

To a 100 ml round bottom flask was added 0.5 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.4 ml ethyl acrylate were added by syringe to the flask under a blanket of nitrogen. To this stirred mixture at room temperature was added by syringe all at once 0.35 ml (0.002 mole) [(1-methoxy-2-methyl-1-propenyl)oxy]-trimethylsilane (MTS). Exothermic polymerization occurred. After 60 minutes reaction 2 ml methanol were added and the mixture stripped of volatiles. A total of 5.3 g poly(ethyl acrylate) were obtained. GPC: [Mn] 1390; [MW] 1650; D 1.19 theor. [Mn] 1550.

EXAMPLE 19

Polymerization of Ethyl Acrylate Catalyzed by Rare Earth-exchanged Zeolite Y

A 10 g sample of rare earth exchanged zeolite Y [SK-500 (Union Carbide)] was calcined in flowing air by raising the temperature 60° C./h to 550° C. and then heating at 550° C. for 10h.

To a 100 ml round bottom flask were added 0.04 g zeolite, 20 ml toluene and 0.35 ml (0.002 moles) [(1-methoxy-2-methyl-1-propenyl)oxy]-trimethylsilane (MTS) by syringe at room temperature under a blanket of nitrogen. Over a period of 10 minutes 5.4 ml ethyl acrylate were added by syringe. Exothermic polymerization occurred. After a total of 70 minutes reaction 2 ml methanol were added by syringe and the mixture was stripped of volatiles. A total of 2.2 g poly(ethyl acrylate) were obtained. GPC: [Mn] 1240; [Mw] 2800; D 2.26 theor. [Mn] 550.

EXAMPLE 20

Polymerization of Ethyl Acrylate Catalyzed by Zeolite RHO

Zeolite $NH_4$-RHO was prepared as follows. A mixture of 180 mL 4M $Na_2AlO_2OH$, 108g 50% CsOH, and 25.92g NaOH was added to 792g of colloidal silica (Ludox® LS-30) in a polytetrafluoroethylene (Teflon®) container, and allowed to stand 6 days at 25° C. The resulting mixture was heated at 95° C. for 6 days. The resulting product was filtered, washed, dried and found to contain primarily zeolite RHO as determined by X-ray powder diffraction. The material was then contacted three times, for one hour each time, with 10% $NH_4NO_3$ solution at 90° C. to give the product $NH_4$-RHO. 3 g of $NH_4$-RHO then were calcined in flowing air by raising the temperature 60° C./h to 600° C. and then heating at 600° C. for 10h.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.4 ml ethyl acrylate were added by syringe to the flask under a blanket of nitrogen. To this stirred mixture at room temperature was added by syringe all at once 0.35 ml (0.002 mole) [(1-methoxy-2-methyl-1-propenyl)oxy]-trimethylsilane (MTS). Exothermic polymerization occurred. After 90 minutes reaction 2 ml methanol were added and the mixture stripped of volatiles. A total of 3.9 g poly(ethyl acrylate) were obtained. GPC: [Mn] 3430; [Mw] 3510; D 1.03; theor. [Mn] 1950.

EXAMPLE 21

Polymerization of Ethyl Acrylate by Monomer-feed Process Catalyzed by Zeolite RHO Zeolite $NH_4$-RHO was prepared as follows. A mixture of 180 mL 4M $Na_2AlO_2OH$, 108g 50% CsOH, and 25.92g NaOH was added to 792g of colloidal silica (Ludox® LS-30) in a polytetrafluoroethylene (Teflon®) container, and allowed to stand 6 days at 25° C. The resulting mixture was heated at 95° C. for 6 days. The resulting product was filtered, washed, dried and found to contain primarily zeolite RHO as determined by X-ray powder diffraction. The material was then contacted three times, for one hour each time, with 10% $NH_4NO_3$ solution at 90° C. to give the product $NH_4$-RHO. 3 g of $NH_4$-RHO then were calcined in flowing air by raising the temperature 60° C./h to 600° C. and then heating at 600° C. for 10h.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature 20 ml toluene and 0.35 ml (0.002 moles) [(1-methoxy-2-methyl-1-propenyl)oxy]-trimethylsilane (MTS) were added by syringe under a blanket of nitrogen Over a period of 10 minutes 5.4 ml ethyl acrylate were added by syringe. Exothermic polymerization occurred. After a total of 30 minutes reaction 2 ml methanol were added and the mixture stripped of volatiles. A total of 4.8 g poly(ethyl acrylate) were obtained. GPC: [Mn] 3240; [Mw] 5400; D 1.67; theor. [Mn] 2400.

EXAMPLE 22

Polymerization of Ethyl Acrylate to Higher Molecular Weight Catalyzed by Type Y Zeolite A 10 g sample of zeolite Y [ELZ-20 (Union Carbide)] was calcined in flowing air by raising the temperature 60° C./h to 550° C. and then heating at 550° C. for 10h.

To a 100 ml round bottom flask was added 0.30 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 10.9 ml ethyl acrylate were added by syringe to the flask under a blanket of nitrogen. To this stirred mixture was added by syringe all at once 0.35 ml (0.002 mole) [(1-methoxy-2-methyl-1-propenyl)oxy]-trimethylsilane (MTS). Exothermic polymerization occurred. After 140 minutes reaction 2 ml methanol were added and the mixture stripped of volatiles. A total of 9.6 g poly(ethyl acrylate) were obtained. GPC: [Mn] 9240; [Mw] 9810; D 1..06; theor. [Mn] 4800.

EXAMPLE 23

Polymerization of Ethyl Acrylate Catalyzed by Clinoptilolite Zeolite

A 25 g sample of Clinoptilolite (Minerals Research) was contacted with 250 mL of 10%$NH_4NO_3$ at 90° C. for 1 hour. After filtration, the resulting material was contacted with additional $NH_4NO_3$ in the same manner two additional times. After the third exchange with ammonium ion, the resulting ammoniated zeolite was washed thoroughly with distilled water, dried at 110° C., and calcined by heating in flowing air by raising the temperature 60° C./h to 700° C. and then heating at 700° C. for 10h.

To a 100 ml round bottom flask was added 0.0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5,4 ml ethyl acrylate were added by syringe to the flask under a blanket of nitrogen. To this stirred mixture at room temperature was added by syringe all at once 0.35 ml (0.002 mole) [(1-methoxy-2-methyl-1-propenyl)oxy]-trimethylsilane (MTS). Exothermic polymerization occurred. After 60 minutes reaction 2 ml methanol were added and the mixture stripped of volatiles. A total of 5.7 g poly(ethyl acrylate) were obtained. GPC: [Mn] 7310 ; [Mw] 1820; D 4.0; theor. [Mn] 2500.

EXAMPLE 24

Polymerization of Ethyl Acrylate Catalyzed by Type Y Zeolite in Hexane

A sample of zeolite Y [CBV-712 (CONTEKA).] was calcined in flowing air by raising the temperature 60° C./h to 700° C. and then heating at 700° C. for 10h.

To a 100 ml round bottom flask was added 0.0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml hexane and 5,4 ml ethyl acrylate were added by syringe to the flask under a blanket of nitrogen. To this stirred mixture at room temperature was added by syringe all at once 0.35 ml (0.002 mole) [(1-methoxy-2-methyl-1-propenyl)oxy]-trimethylsilane (MTS). Exothermic polymerization occurred. After 60 minutes reaction 2 ml methanol were added and the mixture stripped of volatiles. A total of 4.7 g poly(ethyl acrylate) were obtained. GPC: [Mn] 3390 ; [Mw] 8740; D 2.58 ; theor. [Mn] 2350.

EXAMPLE 25

Reaction of Ethyl Acrylate with Type Y Zeolite in Absence of MTS

A 10 g sample of zeolite Y [ELZ-20 (Union Carbide)] was calcined in flowing air by raising the temperature 60° C./h to 550° C. and then heating at 550° C. for 10h.

To a 100 ml round bottom flask was added 0.04 g zeolite. At room temperature 20 ml toluene were added by syringe under a blanket of nitrogen Over a period of 10 minutes 5.4 ml ethyl acrylate were added by syringe. No exotherm was observed and no polymer could be isolated.

This example shows that initiator is required for polymerization to occur.

EXAMPLE 26

Polymerization of Ethyl Acrylate Catalyzed by Zeolite NH4-Erionite

NH4-Erionite (Union Carbide, ELZ-E6, Lot Number 4140-78, used as received).

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5,4 ml ethyl acrylate were added by syringe to the flask under a blanket of nitrogen. To this stirred mixture at room temperature was added by syringe all at once 0.35 ml (0.002 mole) [(1-methoxy-2-methyl-1-propenyl)oxy]-trimethylsilane (MTS). Exothermic polymerization occurred. After 60 minutes reaction 2 ml methanol were added and the mixture stripped of volatiles. A total of 5.3 g poly(ethyl acrylate) were obtained. GPC: [Mn] 4140 ; [Mw] 6800; D 1.64 ; theor. [Mn] 2500.

The effectiveness of this zeolite as received without calcining is attributable to the presence of Lewis acid sites already in the sample.

EXAMPLE 27

Polymerization of Ethyl Acrylate Catalyzed by Zeolite NH4-Chabazite

A 10 g sample of the mineral chabazite from Christmas, Arizona was contacted three times, for one hour each time, with 100 mL of a 10% NH solution at 90° C. The sample was then centrifuged, washed and dried at 100° C. to give NH -chabazite.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.4 ml ethyl acrylate were added by syringe to the flask under a blanket of nitrogen. To this stirred mixture at room temperature was added by syringe all at once 0.35 ml (0.002 mole) [(1-methoxy-2-methyl-1-propenyl)oxy]-trimethylsilane (MTS). Exothermic polymerization occurred. After 60 minutes reaction 2 ml methanol were added and the mixture stripped of volatiles. A total of 5.3 g poly(ethyl acrylate) were obtained. GPC: [Mn] 3160 ; .[Mw] 8070; D 2.55 ; theor. [Mn] 2500.

The effectivenss of this zeolite without calcining is attributable to the presence of pre-existing Lewis acid sites in the sample.

EXAMPLE 28

Polymerization of Ethyl Acrylate Catalyzed by Calcined Zeolite H-Offretite

A sample of offretite was prepared by adding 144 mL Ludox® LS-30 to a mixture containing 40 mL 4M $Na_2AlO_2OH$, 6.40 g NaOH, and 20.4 mL 50% RbOH. The slurry was heated at 100° C. for 21 days and then filtered, washed and dried. X-Ray powder diffraction of the product showed the pattern characteristic of the zeolite offretite. The resulting Rb,Na-offretite was exchanged three times with a solution containing ammonium ions. After washing and drying, the NH4-offretite was calcined in flowing air by raising the temperature 60° C./h to 700° C. and then heating at 700° C. for 10h to give H-offretite.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.4 ml ethyl acrylate were added by syringe to the flask under a blanket of nitrogen. To this stirred mixture at room temperature was added by syringe all at once 0.35 ml (0.002 mole) [(1-methoxy-2-methyl-1-propenyl)oxy]-trimethylsilane (MTS). Exothermic polymerization occurred. After 60 minutes reaction 2 ml methanol were added and the mixture stripped of volatiles. A total of 5.1 g poly(ethyl acrylate) were obtained. GPC: [Mn] 3110 ; [Mw] 4490; D 1.44; theor. [Mn] 2500.

EXAMPLE 29

Polymerization of Ethyl Acrylate Catalyzed by Calcined Zeolite H-Chabazite

A 10 g sample of the mineral chabazite from Christmas, Arizona was contacted three times, for one hour each time, with 100 mL of a 10% NH solution at 90° C. The sample was then centrifuged, washed and dried at 100° C. The resulting NH$_4$-chabazite was then calcined in flowing air by raising the temperature 60° C./h to 700° C. and then heating at 700° C. for 10h to give H-chabazite.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.4 ml ethyl acrylate were added by syringe to the flask under a blanket of nitrogen. To this stirred mixture at room temperature was added by syringe all at once 0.35 ml (0.002 mole) [(1-methoxy-2-methyl-1-propenyl)oxy]-trimethylsilane (MTS). Exothermic polymerization occurred. After 60 minutes reaction 2 ml methanol were added and the mixture stripped of volatiles. A total of 4.5 g poly(ethyl acrylate) were obtained. GPC: [Mn] 2580; [Mw] 6280; D 2.43; theor. [Mn] 2250.

EXAMPLE 30

Polymerization of Ethyl Acrylate Catalyzed by Calcined Type H-L Zeolite 10 g of ELZ-L (Union Carbide, Lot Number 1594-82) was contacted three times, for one hour each time, with 100 mL of a 10% NH$_4$NO$_3$ solution at 90° C. The sample was then centrifuged, washed and dried at 100° C. The resulting NH$_4$-L was then calcined in flowing air by raising the temperature 60° C./h to 700° C. and then heating at 700° C. for 10h to give H-L.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.4 ml ethyl acrylate were added by syringe to the flask under a blanket of nitrogen. To this stirred mixture at room temperature was added by syringe all at once 0.35 ml (0.002 mole) [(1-methoxy-2-methyl-1-propenyl)oxy]-trimethylsilane (MTS). Exothermic polymerization occurred. After 60 minutes reaction 2 ml methanol were added and the mixture stripped of volatiles. A total of 5.3 g poly(ethyl acrylate) were obtained. GPC: [Mn] 3120 ; [Mw] 5600; D 1.79; theor. [Mn] 2500.

EXAMPLE 31

Polymerization of Ethyl Acrylate Catalyzed by Calcined Zeolite H-Omega 10 g of Omega-5 (Union Carbide, Lot Number 9487-87) was contacted three times, for one hour each time, with 100 mL of a 10% NH solution at 90° C. The sample was then centrifuged, washed and dried at 100° C. The resulting NH$_4$-Omega was then calcined in flowing air by raising the temperature 60° C./h to 700° C. and then heating at 700° C. for 10h to give H-Omega.

To a 100 ml round bottom flask was added 0.08 g zeolite. The flask was sealed with a septum under a nitrogen stream and the flask and contents were heated using a hot air gun to ca. 150° C. Upon reaching 150° C., the heat source was removed and the flask and contents allowed to cool under a stream of nitrogen. At room temperature, 20 ml toluene and 5.4 ml ethyl acrylate were added by syringe to the flask under a blanket of nitrogen. To this stirred mixture at room temperature was added by syringe all at once 0.35 ml (0.002 mole) [(1-methoxy-2-methyl-1-propenyl)oxy]-trimethylsilane (MTS). Exothermic polymerization occurred. After 60 minutes reaction 2 ml methanol were added and the mixture stripped of volatiles. A total of 5.3 g poly(ethyl acrylate) were obtained. GPC: [Mn] 2710; [Mw] 6720; D 2.48; theor. [Mn] 2500.

What is claimed is:

1. An improved group transfer polymerization process that produces a "living" polymer comprising contacting under polymerizing conditions at least one acrylic monomer of the formula $CH_2=CHC(O)OX'$ with a tetracoordinate organosilicon initiator of the formula Q'SiZ, wherein:

X' is an aliphatic hydrocarbyl radical containing from 1 to 20 carbon atoms, or $-CH_2CH_2OSi(CH_3)_3$;
    Q' is $-(OR)_{3-x}(R)_x$;
    Z is $-O-C(X'')=C(R')(R'')$
    X'' is $-OSi(X')_3$, or $-OX'$
    R is $-CH_3$;
    each of R' and R'' is selected independently from hydrogen and a hydrocarbyl radical as defined for X';
    x is 0, 1, 2 or 3;

and with a co-catalyst, wherein the improvement comprises using as the co-catalyst an effective amount of a zeolite having Lewis acid sites formed by calcination of the zeolite.

2. A process of claim 1 wherein the zeolite is a type "Y" zeolite.

3. A process of claim 1 wherein the zeolite is a small-pore, RHO, zeolite.

4. A process of claim 1 wherein the zeolite has been calcined by heating within the range of about 550° C. to 700° C. to form Lewis sites.

5. A process of claim 1 wherein the aliphatic hydrocarbyl radical X, of the monomer contains from 1 to 8 carbon atoms.

6. A process of claim 1 wherein the acrylic monomer is selected from the group consisting of methyl, ethyl, butyl and ethylhexyl acrylates.

7. A process of claim 1 wherein the initiator is [(1-methoxy-2-methyl-1-propenyl)oxy]-trimethylsilane.

8. A process of claim .1 wherein the polymerization is in a solvent comprised of toluene.

9. A process of claim 8 wherein the solvent consists essentially of toluene.

10. A process of claim 4 wherein the aliphatic hydrocarbyl radical X' of the monomer contains from 1 to 8 carbon atoms, and the polymerization process is performed in toluene.

11. A process of claim 4 wherein the zeolite is selected from the group consisting of Offretite, Chabazite, L and Omega zeolites.

12. A process of claim 1 wherein the zeolite is selected from the group consisting of NH$_4$-Erionite and NH$_4$-Chabazite.

13. A process of claim 4 wherein the zeolite is Clinoptilolite.

14. A process of claim 4 wherein the zeolite is Mordenite.

15. A process of claim 2 wherein the silicon/aluminum ratio is 5.

16. An improved group transfer polymerization process comprising contacting under polymerizing conditions at least one alkyl acrylate monomer with a tetracoordinate organosilicon polymerization initiator having at least one initiating site and with a catalyst, wherein the improvement comprises said catalyst being a zeolite with Lewis acid sites formed by calcination of the zeolite.

17. A process of claim 11 wherein the polymerization is performed in a solvent consisting essentially of toluene.

18. A process of claim 12 wherein the zeolite is a zeolite which has been calcined at 550 to 700° C.

* * * * *